United States Patent [19]

Retmaniak et al.

[11] 4,239,833
[45] Dec. 16, 1980

[54] GRID OF PRECIOUS METALS FOR THE RECOVERY OF PLATINUM METALS ESCAPING FROM A CATALYST DURING THE REACTION, AND ESPECIALLY OF PLATINUM DURING OXIDATION OF AMMONIA

[75] Inventors: Tadeusz Retmaniak; Mieczysław Marek; Paweł Polak; Andrzej Brzeski, all of Warsaw; Janusz Nyc, Ursus, wy; Bolesław Skowronski, Puławy; Kazimierz Kozłowski, Puławy; Antoni Springwald, Puławy; Henryka Węglarska-Zagorna, Puławy; Eugeniusz Błasiak, Chorzów; Jerzy Studencki; Andrzej Skalski, both of Puławy, all of Poland

[73] Assignees: Mennica Panstwowa, Warsaw; Instytut Nawozow Sztucznych, Puławy, both of Poland

[21] Appl. No.: 973,984

[22] Filed: Dec. 28, 1978

[51] Int. Cl.³ .............................................. B22F 3/00
[52] U.S. Cl. ...................................... 428/567; 245/2; 428/593
[58] Field of Search ...................... 245/2; 428/567, 593

[56] References Cited
U.S. PATENT DOCUMENTS

| | | | |
|---|---|---|---|
| 1,078,380 | 11/1913 | Reynolds | 242/2 |
| 1,915,931 | 6/1933 | Herrmann | 245/2 |
| 2,313,581 | 3/1943 | Reed | 245/2 |
| 3,427,185 | 2/1969 | Cheatham et al. | 428/567 |
| 3,851,681 | 12/1974 | Egan | 245/2 |

Primary Examiner—Brooks H. Hunt
Attorney, Agent, or Firm—Ladas & Parry

[57] ABSTRACT

The subject of the invention is a grid of precious metals for the recovery of platinum metals escaping from a catalyst during the reaction of oxidation of ammonia in the production process of nitric oxide.

In the reactions conducted in the presence of the catalysts containing platinum metals at the incandesence temperature a loss in the mass of precious metals occurs, which disadvantageously effects the economy of the process.

For the recovery of platinum escaping from a catalyst during the reaction of oxidation of ammonia the grids mainly used are those made of palladium-gold alloy, which, in order to increase their strength, are spot-welded into packs, or the separating grids of heat-resisting materials are used.

The known methods of increasing the strength and the durability of the recovery grids are disadvantageous, as the flow of reactants through a pack of grids meets additional resistance, which causes a decrease of the process effectiveness.

The grid according to the invention is characterized by a different thickness of wires in the weave of the grid made of the same precious metals which are used for the recovery of platinum metals. The wires of various thickness are applied, depending on the type of the catalytic process.

3 Claims, No Drawings

GRID OF PRECIOUS METALS FOR THE RECOVERY OF PLATINUM METALS ESCAPING FROM A CATALYST DURING THE REACTION, AND ESPECIALLY OF PLATINUM DURING OXIDATION OF AMMONIA

The subject of the invention is a grid of precious metals for the recovery of platinum metals escaping from a catalyst during the reaction, and especially of platinum during oxidation of ammonia in the production process of nitric oxides and nitric acid.

In reactions conducted in the presence of the catalysts containing platinum metals, at the incandescence temperature, a loss in the mass of precious metals contained in the catalyst occurs. Part of platinum metals is carried away from the catalyst by the passing reactants and gets into the end products of the reaction, another part of platinum metals deposits on the inner surfaces of the reactors and in the pipes of the installation.

Part of the platinum metals escaping from catalysts is irretrievable. The costs thus created effect considerably the economy of the process, especially the costs of the process of ammonia oxidation.

For the recovery of platinum escaping from the catalysts during the reaction according to publication No. 1686 of Johnson Matthey Company the grids used are made of a palladium-gold alloy of a different thickness of wire in one grid.

The grids for the recovery of platinum, while being used, become brittle due to the diffusion of platinum into the palladium-gold alloy. In order to increase their strength several grids are spot-welded into a pack which is then fitted within the installation in the flow path of the reactants, behind the catalytic grids.

Another design solution according to Polish Pat. No. 80333 consists in an application of separating grids made of heat-resisting materials, inserted between the recovery grids, especially the grids of heat-resisting steels.

However, it has been proved that the known methods of increasing the strength and the durability of the recovery grids have disadvantageous effects, as the flow of reactants through a pack of welded grids separated with heat-resisting grids is considerably reduced because of the additional resistances created at the welded spots or due to the grids made of heat-resisting material. The achieved increased strength of the grid pack impedes the whole catalytic process due to the increased pressure drop. An additional inconvenience of the application of separating grids made of heat-resisting material is a decrease of the activity of recovery grids due to their contamination by the products of the loss of the mass of heat-resisting grids.

It has become evident that the grids according to the invention eliminate the inconveniencies and unexpectedly enable the recovery of larger quantities of platinum metals escaping during the reaction, thus affecting advantageously the progress of the process itself, increasing the effectiveness of recovery.

The grid according to the invention has in its weave the wires of different thickness, made of the same precious metals which are used for the recovery of platinum metals.

The differences in the wire thickness and the arrangement of the thicker wires in the weave depend on the type of the catalytic process. In pressureless processes, especially in the processes of ammonia oxidation, it is preferable to employ grids in which the difference of the thickness of wires in the weave is from 30 to 400%.

In medium-pressure processes the grids especially useful are those with the thickness difference in the weave from 60 to 600%.

In high-pressure processes the useful grids are also those with the thickness difference in the weave from 100 to 1000%.

The difference of the wire thickness in the weave is related to the density of the grid and the arrangement of the thick wires in relation to the thin wires.

It is advantageous to apply the thick wires every 10 to 100 thin wires at a slight difference of thickness, whereas at a considerable difference of thickness the sufficient distances are every 15 to 200 thereof.

The thick wires in the weave should be arranged in the warp and in the weft, however, their unidirectional arrangement in the warp or the weft is also advantageous, and it simplifies considerably the manufacture of the grid.

The grid according to the invention is characterized by a considerably increased strength, as compared with the grid of the same wire thickness in the weave.

The grids, according to the invention, assembled in a pack contact directly with one another, and the surfaces of particular wires are used to the maximum for the process of the recovery of platinum metals.

The grid according to the invention advantageously effects the progress of the recovery process, increasing its effectiveness.

We claim:

1. In a grid of precious metals for the recovery of platinum metals escaping from a catalyst during the reaction, especially of platinum during oxidation of ammonia, wherein the grid contains wires of different thickness in the weave which are made of the known precious metals used for the recovery, the improvements which are characterized in that for pressureless catalytic processes the difference in the thickness of wires in the weave is from 30% to 400%, for medium-pressure catalytic processes the difference in the thickness of the wires is from 60% to 600%, for high-pressure catalytic processes the difference in the thickness of the wires is from 100% to 1000%, and in that the thicker wires in the weave are arranged between every 10 to 200 of the thinner wires.

2. The grid according to claim 1, characterized in that the thicker wires in the weave are arranged in the warp and the weft of the grid.

3. The grid according to claim 1, characterized in that the thicker wires in the weave are arranged unidirectionally in the warp or the weft.

* * * * *